United States Patent
Wu et al.

(10) Patent No.: US 8,976,889 B2
(45) Date of Patent: Mar. 10, 2015

(54) WIRELESS WIDE AREA NETWORK TEST METHOD AND TEST SYSTEM

(75) Inventors: Hao Wu, Beijing (CN); Hongjun Yu, Beijing (CN); Xiuqiang Zhao, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 252 days.

(21) Appl. No.: 13/287,384

(22) Filed: Nov. 2, 2011

(65) Prior Publication Data

US 2012/0106382 A1  May 3, 2012

(30) Foreign Application Priority Data

Nov. 3, 2010 (CN) .......................... 2010 1 0536336

(51) Int. Cl.
| | | |
|---|---|---|
| H04B 15/00 | (2006.01) | |
| H04W 24/00 | (2009.01) | |
| H04W 24/10 | (2009.01) | |
| H04B 17/00 | (2006.01) | |
| G01R 31/08 | (2006.01) | |
| H04L 12/26 | (2006.01) | |
| H04W 28/04 | (2009.01) | |
| H04W 84/04 | (2009.01) | |

(52) U.S. Cl.
CPC .......... H04W 24/00 (2013.01); H04B 17/0055 (2013.01); H04B 17/0062 (2013.01); H04B 17/0085 (2013.01); H04W 24/10 (2013.01); H04W 28/04 (2013.01); H04W 84/04 (2013.01)
USPC ..................... 375/285; 455/67.12; 455/226.1; 370/252

(58) Field of Classification Search
CPC .. H04W 24/06; H04W 24/08; H04B 17/0055; H04B 17/0085
USPC .............. 455/67.12, 226.1; 370/252; 375/285
See application file for complete search history.

(56) References Cited

U.S. PATENT DOCUMENTS

| | | | | |
|---|---|---|---|---|
| 5,515,365 | A | * | 5/1996 | Sumner et al. ................. 370/278 |
| 5,530,412 | A | * | 6/1996 | Goldblum ....................... 333/232 |
| 7,109,932 | B2 | * | 9/2006 | Kadambi et al. ............... 343/703 |
| 7,995,968 | B2 | * | 8/2011 | Sotoudeh .................... 455/67.12 |
| 2002/0044597 | A1 | * | 4/2002 | Shively et al. ................. 375/222 |
| 2006/0194553 | A1 | * | 8/2006 | Ozaki et al. ................. 455/226.1 |
| 2008/0031144 | A1 | * | 2/2008 | Kawamoto et al. ........... 370/242 |
| 2008/0080404 | A1 | * | 4/2008 | Kodim .......................... 370/277 |
| 2010/0158088 | A1 | * | 6/2010 | Kim et al. ...................... 375/224 |

(Continued)

OTHER PUBLICATIONS

IEEE Standard Definitions of Terms for Antennas, Revision of IEEE Std 145-1993.*

Primary Examiner — Xavier Szewai Wong
(74) Attorney, Agent, or Firm — Ladas & Parry LLP

(57) ABSTRACT

The embodiments of the present disclosure provide a WWAN test method and a test system related to the communication field, which is suitable for the product research and development stage and can derive a quantitative data relationship between a NFS test result and an OTA test result. The WWAN test method comprises: measuring a power value of noises, denoted by D(NFS), received by an antenna of a terminal to be tested in a NFS test manner; measuring a power attenuation value, denoted by D-sense, of a path from a WWAN module to the antenna of the terminal; obtaining an antenna efficiency value, denoted by AE, of the terminal; and obtaining a TIS value of an OTA test result by TIS=D(NFS)+D-sense−AE. The embodiments of the present disclosure can be used in the NFS test.

9 Claims, 4 Drawing Sheets

(56) References Cited

U.S. PATENT DOCUMENTS

2010/0266063 A1* 10/2010 Harel et al. .................. 375/267
2011/0206097 A1* 8/2011 Darden, IV .................. 375/219
2012/0232826 A1* 9/2012 Rivoir et al. .................. 702/117

* cited by examiner

WIRELESS WIDE AREA NETWORK TEST METHOD AND TEST SYSTEM

TECHNICAL FIELD

The present disclosure relates to the communication field, especially to a WWAN (Wireless Wide Area Network) test method and its test system.

BACKGROUND ART

Recently, as the notebook computer becomes increasingly powerful in its wireless function, especially with the widely spread of applications related to 3G surfing, people has focused on the issues that wireless communication is affected by respective components inside the notebook computer which was ignored previously. One typical issue is the Wireless Wide Area Network (WWAN) wireless test.

Generally, the final evaluation means and method for wireless function related application is the Over The Air (OTA) test as shown in FIG. 1, i.e., a test of wireless communication function of a product by an actual method for simulating communication. However, this final scheme requires complex conditions, a high cost, and a long test time. Moreover, a relatively large electromagnetic-shielding room is needed during the test. Therefore, it is not suitable for applying at the product research and development stage.

At the product research and development stage, the method used frequently is the wireless WWAN test method with a scan of antenna noise, i.e., the Noise Floor System (NFS) test method as shown in FIG. 2. Such a method is of a relatively low cost with a relatively short test time, and it only requires a very small electromagnetic-shielding room which is easily equipped in a lab, and therefore is suitable for debugging in the product research and development process.

However, there is only a qualitative relationship between the two kinds of tests based on the current understanding and knowledge theoretically. For example, if there is relatively large noise in a certain frequency band in the NFS test result, there will also be noise in the frequency band correspondingly in the OTA test result. However, there is no method to find the data relationship between the two kinds of tests quantitatively. As a result, there is no way to determine the data difference between the two kinds of tests, and error may easily occur when making decisions based on the data. For example, generally, the NFS test result is taken as a reference in the product research and development process. If the difference between the NFS test result and the final OTA test result cannot be known, problems may occur in the final OTA test for product detection. On the other hand, if the OTA test is directly used in the research and development process, people may face problems such as high cost, large occupied area, low test speed etc., which are not suitable for the research and development process.

SUMMARY OF THE DISCLOSURE

The embodiments of the present disclosure provide a WWAN test method and a test system suitable for the product research and development stage, which can obtain a quantitative data relationship between a NFS test result and an OTA test result.

To achieve the above object, the embodiments of the present disclosure utilize the following technical solutions.

A WWAN test method, comprises:
measuring a power value of noises, denoted by D(NFS), received by an antenna of a terminal to be tested in a NFS test manner;
measuring a power attenuation value, denoted by D-sense, of a path from a WWAN module to the antenna of the terminal;
obtaining an antenna efficiency value, denoted by AE, of the terminal; and
obtaining a TIS value of an OTA test result by:

$TIS=D(NFS)+D\text{-sense}-AE.$

A WWAN test system, comprises:
a spectrum analyzer connected to an antenna of a terminal to be tested in wire, which measures a power value of noises, denoted by D(NFS), of respective components of the terminal itself received by the antenna, and measures a power attenuation value, denoted by D-sense, of a path from a WWAN module to the antenna of the terminal;
a base station simulator connected to the WWAN module of the terminal to be tested in wire, which receives the power value of noises received by the antenna and transmitted from the WWAN module;
a control device connected to the spectrum analyzer and the base station simulator, which controls the spectrum analyzer and the base station simulator, and calculates a TIS value of an OTA test result based on the power value of noises D(NFS) and the power attenuation value D-sense obtained by the spectrum analyzer, and a set antenna efficiency value AE, by the formula of:

$TIS=D(NFS)+D\text{-sense}-AE.$

The WWAN test method and the test system according to the embodiments of the present disclosure measures The power value of noises, denoted by D(NFS), received by the antenna of the terminal to be tested in the NFS test manner, then measures the power attenuation value, denoted by D-sense, of the path from the WWAN module to the antenna of the terminal, obtains the antenna efficiency value denoted by AE, and obtains the TIS value of the OTA test result by: TIS=D(NFS)+D-sense−AE. Thereby, a quantitative data relationship between the NFS test result and the OTA test result is obtained. Therefore, the final OTA test result can be derived from the NFS test at the product research and development stage, and thereby the design quality of the product can be assued.

BRIEF DESCRIPTION OF THE DRAWINGS

In the following, a brief introduction will be given to the attached drawings necessary for the description of the embodiments of the present disclosure or the prior art, so as to explain the technical solutions in the embodiments or the prior art more clearly. Obviously, the figures in the following description are only some examples of the present disclosure, and other figures are apparent without inventive labor based on these figures to those of ordinary skill in the art, in which.

DESCRIPTION OF THE EMBODIMENTS

In the following, the technical solutions of the embodiments of the present disclosure will be described clearly and thoroughly with reference to the figures in the embodiments of the present disclosure. Obviously, the described embodiments are only a part of, but not all, embodiments of the present disclosure. All the other embodiments obtained based on the embodiments of the present disclosure without inventive labor by those of ordinary skill in the art shall fall within the protection scope of the present disclosure.

Figure 1:
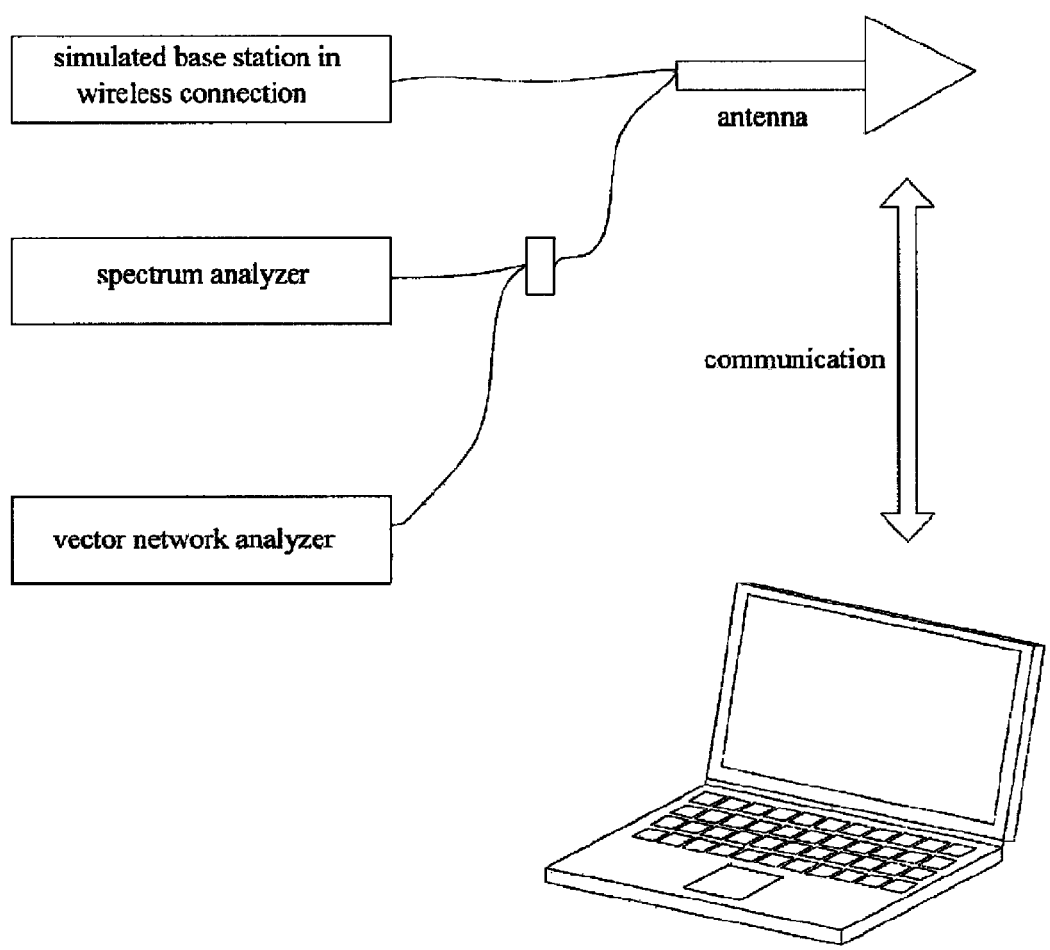
FIG. 1 is a structural schematic diagram of the OTA test in the prior art.
Figure 2:
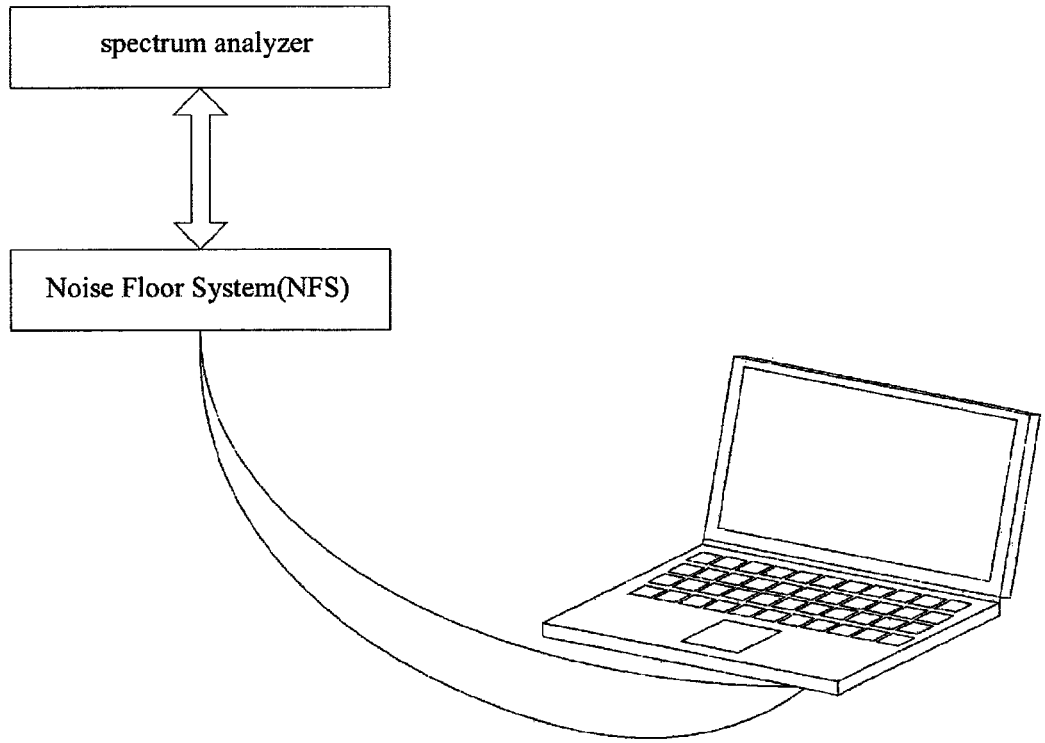
FIG. 2 is a structural schematic diagram of the NFS test in the prior art.
Figure 3:
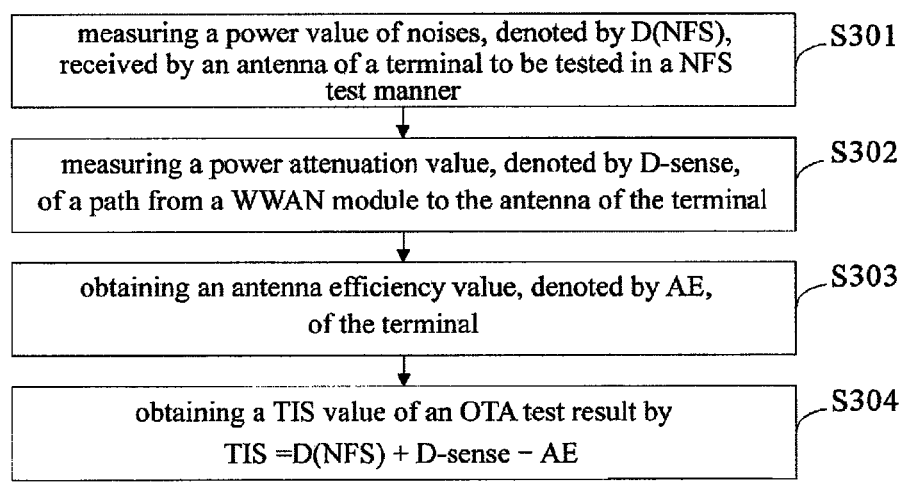
FIG. 3 is a flowchart of a WWAN test method according to an embodiment of the present disclosure.

As shown in FIG. 3, the WWAN test method according to an embodiment of the present disclosure comprises the following steps.

At S301, a power value of noises, denoted by D(NFS), received by an antenna of a terminal to be tested is measured in an NFS test manner.

Specially, the power value of noises received by the antenna of the terminal to be tested can be obtained in a relatively small electromagnetic-shielding room in the current NFS test manner. Since the terminal to be tested is located in the electromagnetic-shielding room, the power value of noises received by its antenna is the noise power of the respective components of the terminal itself.

Also, due to the adoption of the NFS test manner, which requires a relatively small electromagnetic-shielding room, a low cost and a short test time, it is suitable for the product research and development stage.

At S302, a power attenuation value, denoted by D-sense, of a path from a WWAN module to the antenna of the terminal is measured.

Specially, a conducted sensitivity power value can be measured firstly when the WWAN module is connected to a load. Then, a contacted sensitivity power value can be measured when the WWAN module transmits the power value of noises received by the antenna to the simulated base station. The difference between the two measured power values is the power attenuation value of the path from the WWAN module to the antenna.

At S303, an antenna efficiency value, denoted by AE, of the terminal is obtained.

Generally, vendors provide the antenna efficiency value in materials such as specification related to the antenna. So the antenna efficiency value can be obtained directly.

At S304, a TIS value of an OTA test result is obtained by: TIS=D(NFS)+D-sense−AE.

The WWAN test method according to the embodiment of the present disclosure measures the power value of noises, denoted by D(NFS), received by the antenna of the terminal to be tested in the NFS test manner, then measures the power attenuation value, denoted by D-sense, of the path from the WWAN module to the antenna of the terminal, obtains the antenna efficiency value denoted by AE, and obtains the TIS value of the OTA test result by: TIS=D(NFS)+D-sense−AE. Thereby, a quantitative data relationship between the NFS test result and the OTA test result is obtained. Therefore, the final OTA test result can be derived from the NFS test at the product research and development stage, and thereby the design quality of the product can be assured.

Figure 4:
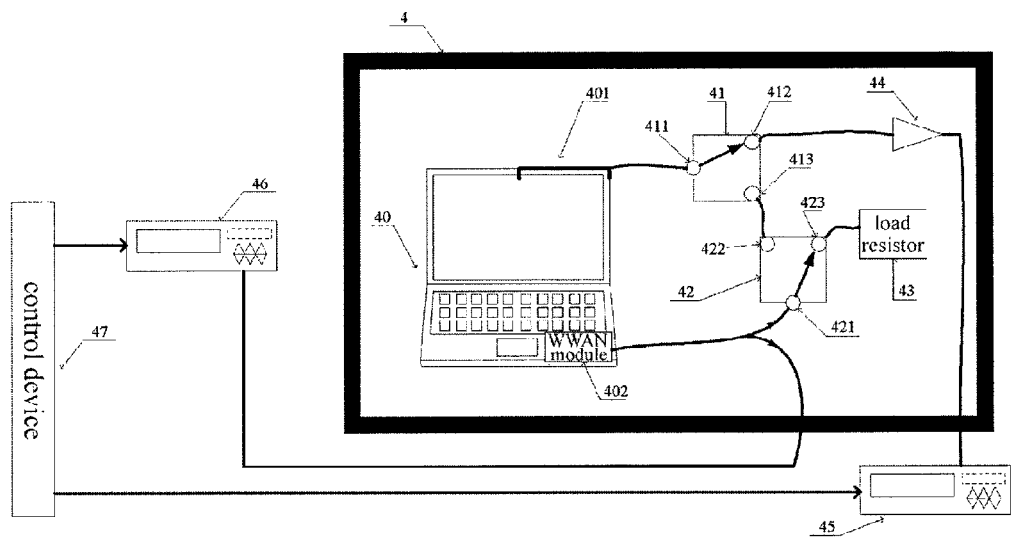
FIG. 4 is a first structural schematic diagram of a test system used by the WWAN test method according to another embodiment of the present disclosure.
Figure 5:
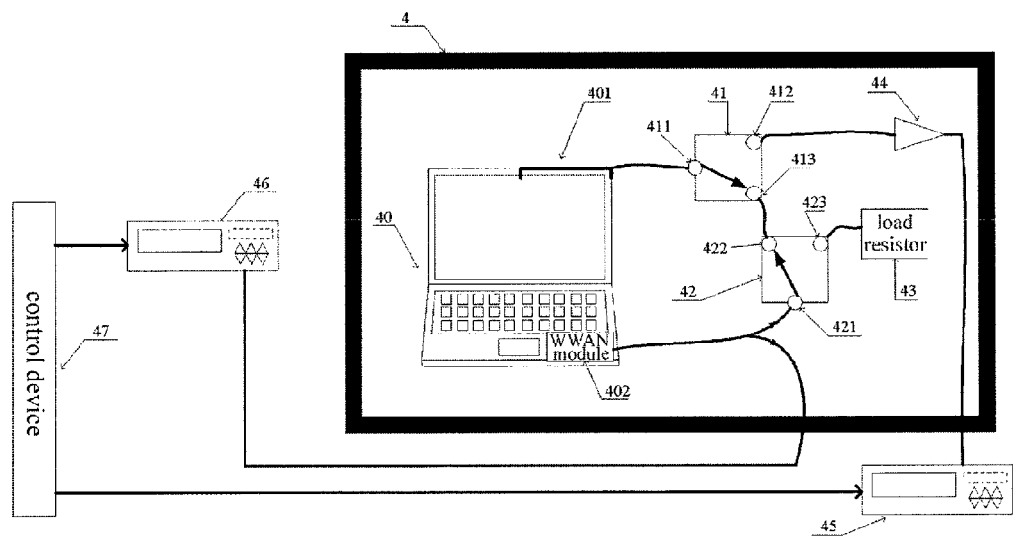
FIG. 5 is a second structural schematic diagram of the test system used by the WWAN test method according to another embodiment of the present disclosure.

A device employed by the WWAN test method in the test process according to another embodiment of the present disclosure is as shown in FIGS. 4 and 5.

In FIG. 4, there is a relatively small electromagnetic-shielding room 4, in which a terminal 40 to be tested, a first Single-Pole-Double-Throw switch 41, a second Single-Pole-Double-Throw switch 42, a load resistor 43 and an amplifier 44 are disposed. In the embodiment, it is assumed that the terminal 40 to be tested is a notebook computer 40, and the load resistor 43 is a resistor of 50Ω. The detailed connection relationship is as follows:

An antenna 401 of the notebook computer 40 is electrically connected to the first Single-Pole-Double-Throw switch 41 in wire, and a WWAN module 402 of the notebook computer 40 is electrically connected to the second Single-Pole-Double-Throw switch 42 in wire. Specially, the antenna 401 is electrically connected to a movable contact 411 of the first Single-Pole-Double-Throw switch 41 in wire, a first fixed contact 412 of the first Single-Pole-Double-Throw switch 41 is electrically connected to the amplifier 44, a second fixed contact 413 of the first Single-Pole-Double-Throw switch 41 is electrically connected to a first fixed contact 422 of the second Single-Pole-Double-Throw switch 42; the WWAN module 402 is electrically connected to a movable contact 421 of the second Single-Pole-Double-Throw switch 42 in wire, the first fixed contact 422 of the second Single-Pole-Double-Throw switch 42 is electrically connected to the second fixed contact 413 of the first Single-Pole-Double-Throw switch 41, and a second fixed contact 423 of the second Single-Pole-Double-Throw switch 42 is electrically connected to the load resistor 43.

A spectrum analyzer 45, a base station simulator 46 and a control device 47 are disposed outside the electromagnetic-shielding room 4. The spectrum analyzer 45 is electrically connected to the amplifier 44 in the electromagnetic-shielding room 4 in wire, the base station simulator 46 is electrically connected to the WWAN module 402 of the notebook computer 40 in the electromagnetic-shielding room 4 in wire, and the control device 47 is connected to the spectrum analyzer 45 and the base station simulator 46, respectively, so as to control the spectrum analyzer 45 and the base station simulator 46, sense out the spectrum analyzer 45, calculate and so on.

When the test is carried out, firstly, the knife switch of the first Single-Pole-Double-Throw switch 41 is turned to the first fixed contact 412, i.e., the antenna 401 of the notebook computer 40 is electrically connected to the spectrum analyzer 45 through the amplifier 44 in wire, as shown in FIG. 4. Meanwhile, the knife switch of the second Single-Pole-Double-Throw switch 42 is turned to the second fixed contact 423, i.e., the WWAN module 402 of the notebook computer 40 is electrically connected to the load resistor 43 in wire.

In this case, a power value of noises, denoted by D(NFS), received by the antenna 401 of the notebook computer 40 is sensed out by the spectrum analyzer 45. Since the notebook computer 40 is located in the electromagnetic-shielding room 4, the power value of noises received by its antenna 401 is that of respective components of the notebook computer 40 itself. This test process is similar to that of the current NFS test manner.

The WWAN module 402 of the notebook computer 40 is electrically connected to the load resistor 403, which equivalently connect to a unit load, meanwhile, the spectrum analyzer 45 senses a power value existing in the test environment through the antenna 401, which is defined as a conducted sensitivity power value, denoted by C1.

Then, as shown in FIG. 5, the knife switch of the first Single-Pole-Double-Throw switch 41 is turned to the second fixed contact 413, and the knife switch of the second Single-Pole-Double-Throw switch 42 is turned to the first fixed contact 422, i.e., the antenna 401 of the notebook computer 40 is connected to the WWAN module 402 in wire, and the WWAN module 402 is electrically connected to the base station simulator 46 outside the electromagnetic-shielding room 4 in wire.

In this case, the antenna 401 transmits the received noise power value D(NFS) to the base station simulator 46 through the WWAN module 402 to simulate the real operation state. The spectrum analyzer 45 is tuned to sense the power value existing in the test environment and processed and transmitted by the WWAN module 402 through the antenna 401, which is defined as a contacted sensitivity power value, denoted by C2. The test mode of the present embodiment differs from that of the OTA test mode mainly in that a wire communication method in contact is used in the present embodiment, while a wireless communication is used in the OTA test.

The power difference between the two tests indicates a power attenuation value, denoted by D-sense, of a path from the WWAN module 402 to the antenna 401. Then, D-sense=|C1−C2|.

An efficiency of the antenna 401, denoted by AE (Antenna Efficiency), of the notebook computer 40 can be acquired from the materials provided by the vendor.

Then, a TIS value, the result of the OTA test, can be derived from the above tests by the following formula:

$$TIS=D(NFS)+D\text{-sense}-AE \quad \text{(Formula 1)}$$

In Formula 1, D-sense indicates the attenuation of the path from the WWAN module to the antenna, which varies little among the systems of the notebook computers practically. Therefore, the D-sense obtained in this test can be popularized as an estimation value. For the same reason, the antenna efficiency AE varies little among the systems of the notebook computers, and it can be popularized as well. After a test to obtain the two values of D-sense and AE, a steady quantitative relationship is established between the NFS test result D(NFS) and the OTA test result TIS in the subsequent NFS tests.

Every time the D(NFS) value is measured, the control device 47 can obtain the TIS value from the calculation based on the above noise power value D(NFS), the power attenuation value D-sense and the antenna efficiency value AE transmitted thereto. Then, a quantitative relationship can be established between the two different test methods, so as to derive the final OTA test result from the NFS test at the product research and development stage with a lower cost and a faster speed, and thereby the design quality of the product can be assured.

Figure 6:
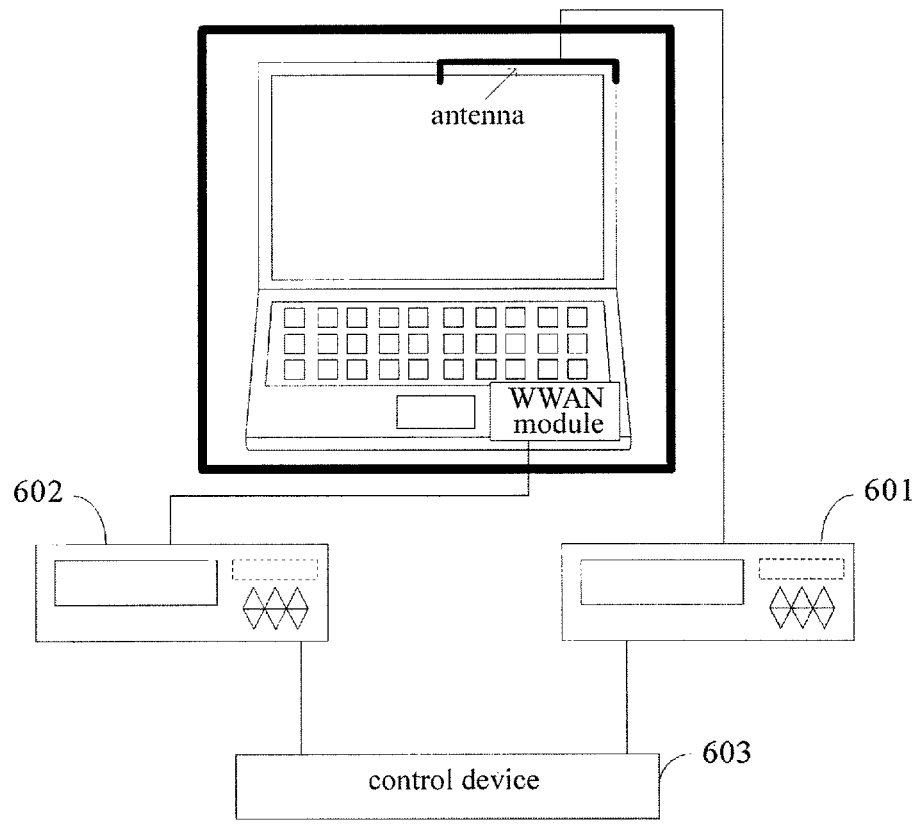
FIG. 6 is a structural schematic diagram of the WWAN test system according to an embodiment of the present disclosure.

As shown in FIG. 6, a WWAN test system according to the embodiment of the present disclosure comprises:

a spectrum analyzer 601 connected to an antenna of a terminal to be tested in wire, which measures a power value of noises, denoted by D(NFS), of respective components of the terminal itself received by the antenna, and measures a power attenuation value, denoted by D-sense, of a path from the WWAN module to the antenna of the terminal.

Specially, the spectrum analyzer 601 senses a conducted sensitivity power value in the environment, denoted by C1, through the antenna, in a condition that the WWAN module of the terminal is connected to a load resistor; and obtains a contacted sensitivity power value, denoted by C2, when the power value of noises D(NFS) processed by the WWAN module is transmitted to the base station simulator connected in wire by the antenna; then, the power attenuation value of the path from the WWAN module to the antenna is |C1−C2|, denoted by D-sense.

The WWAN test system further comprises:

a base station simulator 602 connected to the WWAN module of the terminal to be tested in wire, which receives the power value of noises received by the antenna and transmitted from the WWAN module; and a control device 603 connected to the spectrum analyzer 601 and the base station simulator 602, which controls the spectrum analyzer 601 and the base station simulator 602, and calculates a TIS value of an OTA test result based on the power value of noises D(NFS) and the power attenuation value D-sense obtained by the spectrum analyzer 601, and a set antenna efficiency value AE, by the formula of: TIS =D(NFS)+D-sense−AE.

In the present embodiment, the terminal to be tested is located in the electromagnetic-shielding room.

The WWAN test system according to the embodiment of the present disclosure measures the power value of noises, denoted by D(NFS), received by the antenna of the terminal to be tested in the NFS test manner by the spectrum analyzer, then measures the power attenuation value, denoted by D-sense, of the path from the WWAN module to the antenna of the terminal by the spectrum analyzer using a base station simulator, obtains an antenna efficiency value denoted by AE, and calculates the TIS value of the OTA test result by the formula of TIS=D(NFS)+D-sense−AE. Thereby, the TIS value can be obtained every time the D(NFS) value is measured. Then, the final OTA test result can be derived from the NFS test at the product research and development stage, and thereby the design quality of the product can be assured.

Figure 7:
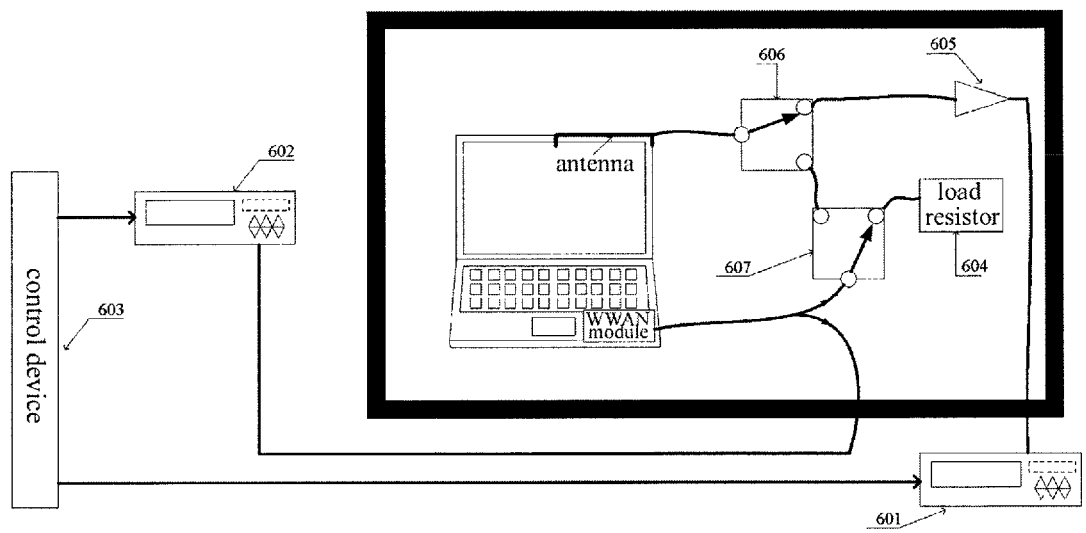
FIG. 7 is another structural schematic diagram of the WWAN test system according to an embodiment of the present disclosure.

Moreover, as shown in FIG. 7, the WWAN test system further comprises:

a load resistor 604 electrically connected to the WWAN module when the conducted sensitivity power value of the WWAN module is measured by the spectrum analyzer 601;

an amplifier 605 deployed between the antenna and the spectrum analyzer 601;

a first Single-Pole-Double-Throw switch 606, a movable contact of which is electrically connected to the antenna of the terminal to be tested in wire, a first fixed contact of which is electrically connected to the spectrum analyzer 601 through the amplifier 605, and a second fixed contact of which is electrically connected to a first fixed contact of a second Single-Pole-Double-Throw switch 607; and the second Single-Pole-Double-Throw switch 607, a movable contact of which is electrically connected to the WWAN module of the terminal to be tested in wire, a first fixed contact of which is electrically connected to the second fixed contact of the first Single-Pole-Double-Throw switch 606, and a second fixed contact of which is electrically connected to the load resistor 604.

With the two Single-Pole-Double-Throw switches, the switching can be carried out conveniently in one test, which is advantageous to make the test fast and the test procedure simple.

In the present embodiment, the load resistor can be a resistor of 50Ω.

Those of ordinary skill in the art can appreciate that all or part of the steps implementing the above method embodiments can be realized by hardware in connection with program instructions which can be stored in a computer readable storage medium. When the abovementioned program instructions are performed, the steps of the above method embodiments are performed. The above storage medium can be such as ROM, RAM, a magnetic disk, an optical disk, other media which can store program codes, or the like.

The above are only detailed implementations of the present disclosure. Nevertheless, the protection scope of the present disclosure is not limited thereto. Those skilled in the art can think of variations or alternations easily with the technical scope disclosed by the present disclosure, and such variations or alternations should fall within the protection scope of the present disclosure. Then, the protection scope of the present disclosure should be defined by the claims as attached.

What is claimed is:

1. A WWAN test method, comprising:
measuring a power value of noises, denoted by D(NFS), received by an antenna of a terminal to be tested in a Noise Floor System NFS test manner, wherein the terminal to be tested is located in an electromagnetic-shielding room, the noises are noises of respective components of the terminal to be tested itself;
measuring a power attenuation value, denoted by D-sense, of a path from a WWAN module of the terminal to be tested to the antenna of the terminal to be tested;
obtaining an antenna efficiency value, denoted by AE, of the terminal to be tested; and
obtaining a Total Isotropic Sensitivity TIS value of an Over The Air OTA test result by: TIS=D(NFS)+D-sense−AE,
wherein, measuring a power attenuation value of a path from a WWAN module to the antenna of the terminal comprising:
sensing a conducted sensitivity power value, denoted by C1, of the WWAN module, by a spectrum analyzer connected to the antenna in wire, in a condition that the WWAN module of the terminal is connected to a load;
sensing a contacted sensitivity power value, denoted by C2, of the WWAN module, by the spectrum analyzer, when the WWAN module transmits the power value of noises received by the antenna to a base station simulator connected to the WWAN module in wire; and
obtaining the power attenuation value of the path from the WWAN module to the antenna by: |C1−C2|.

2. The method according to claim 1, wherein, measuring a power value of noises received by an antenna of a terminal to be tested in a NFS test manner comprising:
sensing the power value of noises of respective components of the terminal itself received by the antenna, by a spectrum analyzer connected to the antenna of the terminal to be tested in wire.

3. The method according to claim 1, wherein, the load is a resistor of 50Ω.

4. A WWAN test system, comprising:
a spectrum analyzer connected to an antenna of a terminal to be tested in wire, which measures a power value of noises, denoted by D(NFS), of respective components of the terminal to be tested itself received by the antenna in a Noise Floor System NFS test manner, and measures a power attenuation value, denoted by D-sense, of a path from a WWAN module of the terminal to be tested to the antenna of the terminal to be tested, wherein the terminal to be tested is located in an electromagnetic-shielding room, the noises are noises of respective components of the terminal to be tested itself;
a base station simulator connected to the WWAN module of the terminal to be tested in wire, which receives the power value of noises received by the antenna and transmitted from the WWAN module;
a control device connected to the spectrum analyzer and the base station simulator, which controls the spectrum analyzer and the base station simulator, and calculates a Total Isotropic Sensitivity TIS value of an Over The Air OTA test result based on the power value of noises D(NFS) and the power attenuation value D-sense obtained by the spectrum analyzer, and a set antenna efficiency value AE, by the formula of:

$$TIS=D(NFS)+D\text{-sense}-AE,$$

wherein, measuring a power attenuation value of a path from a WWAN module to the antenna of the terminal comprising:
sensing a conducted sensitivity power value, denoted by C1, of the WWAN module, by a spectrum analyzer connected to the antenna in wire, in a condition that the WWAN module of the terminal is connected to a load;
sensing a contacted sensitivity power value, denoted by C2, of the WWAN module, by the spectrum analyzer, when the WWAN module transmits the power value of noises received by the antenna to a base station simulator connected to the WWAN module in wire; and
obtaining the power attenuation value of the path from the WWAN module to the antenna by: |C1−C2|.

5. The WWAN test system according to claim 4, further comprising:
a load resistor electrically connected to the WWAN module when a conducted sensitivity power value of the WWAN module is measured by the spectrum analyzer.

6. The WWAN test system according to claim 4, further comprising:
an amplifier deployed between the antenna and the spectrum analyzer.

7. The WWAN test system according to claim 6, further comprising:
a first Single-Pole-Double-Throw switch, a movable contact of which is electrically connected to the antenna of the terminal to be tested in wire, a first fixed contact of which is electrically connected to the spectrum analyzer through the amplifier, and a second fixed contact of which is electrically connected to a first fixed contact of a second Single-Pole-Double-Throw switch; and
the second Single-Pole-Double-Throw switch, a movable contact of which is electrically connected to the WWAN module of the terminal to be tested in wire, a first fixed contact of which is electrically connected to the second fixed contact of the first Single-Pole-Double-Throw switch, and a second fixed contact of which is electrically connected to the load resistor.

8. The WWAN test system according to claim 5, wherein, the load resistor is a resistor of 50Ω.

9. The WWAN test system according to claim 7, wherein, the load resistor is a resistor of 50Ω.

* * * * *